(12) United States Patent
Bennett et al.

(10) Patent No.: US 9,877,209 B2
(45) Date of Patent: *Jan. 23, 2018

(54) SURFACE-WAVE COMMUNICATIONS AND METHODS THEREOF

(71) Applicant: AT&T INTELLECTUAL PROPERTY I, L.P., Atlanta, GA (US)

(72) Inventors: Robert Bennett, Southold, NY (US); Donald J. Barnickel, Flemington, NJ (US); Farhad Barzegar, Branchburg, NJ (US); Irwin Gerszberg, Kendall Park, NJ (US); Paul Shala Henry, Holmdel, NJ (US); Thomas M. Willis, III, Tinton Falls, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/581,434

(22) Filed: Apr. 28, 2017

(65) Prior Publication Data

US 2017/0230842 A1   Aug. 10, 2017

Related U.S. Application Data

(63) Continuation of application No. 15/254,841, filed on Sep. 1, 2016, now Pat. No. 9,674,711, which is a
(Continued)

(51) Int. Cl.
*H04B 3/36* (2006.01)
*H04W 16/26* (2009.01)
(Continued)

(52) U.S. Cl.
CPC .............. *H04W 16/26* (2013.01); *H04B 3/36* (2013.01); *H04B 3/52* (2013.01); *H04B 3/56* (2013.01); *H04W 52/52* (2013.01)

(58) Field of Classification Search
USPC .................................................. 455/7, 14, 15
See application file for complete search history.

(56) References Cited

U.S. PATENT DOCUMENTS

| 2,685,068 | A | 7/1954 | Goubau |
| 2,754,513 | A | 7/1956 | Goubau |
(Continued)

FOREIGN PATENT DOCUMENTS

| AU | 2014200748 A1 | 3/2014 |
| EP | 1898532 A2 | 3/2008 |
(Continued)

OTHER PUBLICATIONS

"International Preliminary Report on Patentability", PCT/US2014/060841, dated May 19, 2016, 8 pages.
(Continued)

*Primary Examiner* — Fayyaz Alam
(74) *Attorney, Agent, or Firm* — Guntin & Gust, PLC; Matthew Tropper

(57) ABSTRACT

Aspects of the subject disclosure may include, for example, a system including a frequency mixer that combines a signal and a carrier wave to form a combined signal, and a transmitter that generates a transmission based on the combined signal. The system can also include a coupling device that emits the transmission as an electromagnetic wave guided by an outer surface of a transmission medium. The electromagnetic wave can propagate longitudinally along the surface of the transmission medium and at least partially around the surface of the transmission medium. Other embodiments are disclosed.

20 Claims, 10 Drawing Sheets

Related U.S. Application Data continuation of application No. 14/838,997, filed on Aug. 28, 2015, now Pat. No. 9,467,870, which is a continuation of application No. 14/689,103, filed on Apr. 17, 2015, now Pat. No. 9,154,966, which is a continuation of application No. 14/513,588, filed on Oct. 14, 2014, now Pat. No. 9,042,812, which is a continuation of application No. 14/073,267, filed on Nov. 6, 2013, now Pat. No. 8,897,697.

(51) Int. Cl.
*H04B 3/52* (2006.01)
*H04B 3/56* (2006.01)
*H04W 52/52* (2009.01)

(56) References Cited

U.S. PATENT DOCUMENTS

| | | | |
|---|---|---|---|
| 2,794,959 A | 6/1957 | Fox | |
| 3,040,278 A | 6/1962 | Griemsmann et al. | |
| 3,509,463 A | 4/1970 | Woodward et al. | |
| 4,743,916 A | 5/1988 | Bengeult | |
| 4,772,891 A | 9/1988 | Svy | |
| 5,117,237 A | 5/1992 | Legg | |
| 5,652,554 A | 7/1997 | Krieg et al. | |
| 6,005,758 A | 12/1999 | Spencer et al. | |
| 6,404,773 B1 | 6/2002 | Williams et al. | |
| 6,452,467 B1 | 9/2002 | McEwan | |
| 6,639,566 B2 | 10/2003 | Knop et al. | |
| 7,145,440 B2 | 12/2006 | Gerszberg et al. | |
| 7,450,001 B2 | 11/2008 | Berkman | |
| 7,463,877 B2 | 12/2008 | Iwamura | |
| 7,466,225 B2 | 12/2008 | White, II et al. | |
| 7,522,812 B2 | 4/2009 | Zitting | |
| 7,546,214 B2 | 6/2009 | Rivers, Jr. et al. | |
| 7,561,025 B2 | 7/2009 | Gerszberg et al. | |
| 7,567,154 B2 | 7/2009 | Elmore | |
| 7,570,470 B2 | 8/2009 | Holley | |
| 7,590,404 B1 | 9/2009 | Johnson et al. | |
| 7,671,701 B2 | 3/2010 | Radtke | |
| 7,680,561 B2 | 3/2010 | Rodgers et al. | |
| 7,747,356 B2 | 6/2010 | Andarawis et al. | |
| 7,761,079 B2 | 7/2010 | Mollenkopf et al. | |
| 7,852,837 B1 | 12/2010 | Au et al. | |
| 7,986,711 B2 | 7/2011 | Horvath et al. | |
| 7,992,014 B2 | 8/2011 | Langgood et al. | |
| 8,090,379 B2 | 1/2012 | Lambert et al. | |
| 8,111,148 B2 | 2/2012 | Parker et al. | |
| 8,134,458 B2 | 3/2012 | Lund | |
| 8,159,933 B2 | 4/2012 | Henry | |
| 8,160,530 B2 | 4/2012 | Corman et al. | |
| 8,237,617 B1 | 8/2012 | Johnson et al. | |
| 8,238,824 B2 | 8/2012 | Washiro | |
| 8,258,743 B2 | 9/2012 | Tyler et al. | |
| 8,295,301 B2 | 10/2012 | Yonge, III et al. | |
| 8,344,829 B2 | 1/2013 | Miller, II et al. | |
| 8,406,239 B2 | 3/2013 | Hurwitz et al. | |
| 8,537,705 B2 | 9/2013 | Afkhamie et al. | |
| 8,681,463 B2 | 3/2014 | Franks et al. | |
| 8,897,697 B1 * | 11/2014 | Bennett | H04B 7/022 340/531 |
| 9,042,812 B1 | 5/2015 | Bennett et al. | |
| 2004/0165669 A1 * | 8/2004 | Otsuka | H04L 5/1461 375/257 |
| 2006/0114925 A1 | 6/2006 | Gerszberg et al. | |
| 2006/0120399 A1 | 6/2006 | Claret et al. | |
| 2007/0025386 A1 | 2/2007 | Riedel et al. | |
| 2007/0054622 A1 | 3/2007 | Berkman | |
| 2007/0144779 A1 | 6/2007 | Vicente et al. | |
| 2009/0067441 A1 | 3/2009 | Ansari et al. | |
| 2009/0079660 A1 * | 3/2009 | Elmore | H04B 3/56 343/904 |
| 2009/0315668 A1 | 12/2009 | Leete, III et al. | |
| 2011/0110404 A1 * | 5/2011 | Washiro | H04B 5/00 375/219 |
| 2011/0136432 A1 | 6/2011 | Miller, II et al. | |
| 2012/0091820 A1 | 4/2012 | Campanella et al. | |
| 2012/0263152 A1 | 10/2012 | Fischer et al. | |
| 2012/0329523 A1 | 12/2012 | Stewart et al. | |
| 2013/0003876 A1 | 1/2013 | Bennett | |
| 2013/0064311 A1 * | 3/2013 | Turner | H01P 3/00 375/259 |
| 2014/0032005 A1 | 1/2014 | Iwamura | |
| 2015/0126107 A1 | 5/2015 | Bennett et al. | |
| 2015/0223078 A1 | 8/2015 | Bennett et al. | |
| 2015/0373557 A1 | 12/2015 | Bennett et al. | |
| 2016/0285508 A1 | 9/2016 | Bennett et al. | |
| 2016/0373937 A1 | 12/2016 | Bennett et al. | |
| 2017/0222689 A1 | 8/2017 | Bennett | |

FOREIGN PATENT DOCUMENTS

| | | |
|---|---|---|
| EP | 2568528 A2 | 3/2013 |
| IN | 201647015348 A | 8/2016 |
| WO | 2013073548 A1 | 5/2013 |
| WO | 2015069431 A2 | 5/2015 |

OTHER PUBLICATIONS

"International Search Report & Written Opinion", PCT/US2014/060841, dated Jan. 7, 2015.

Sommerfeld, A., "On the propagation of electrodynamic waves along a wire", Annals of Physics and Chemistry New Edition, vol. 67, No. 2, 1899, 72 pages.

* cited by examiner

US 9,877,209 B2

SURFACE-WAVE COMMUNICATIONS AND METHODS THEREOF

CROSS-REFERENCE TO RELATED APPLICATIONS

This application is a continuation of and claims priority to U.S. patent application Ser. No. 15/254,841, filed Sep. 1, 2016, which is a continuation of and claims priority to U.S. patent application Ser. No. 14/838,997, filed Aug. 28, 2015, now U.S. Pat. No. 9,467,870, which is a continuation of and claims priority to U.S. patent application Ser. No. 14/689, 103, filed Apr. 17, 2015, now U.S. Pat. No. 9,154,966, which is a continuation of and claims priority to U.S. patent application Ser. No. 14/513,588, filed Oct. 14, 2014, now U.S. Pat. No. 9,042,812, which is a continuation of and claims priority to U.S. patent application Ser. No. 14/073, 267, filed Nov. 6, 2013, now U.S. Pat. No. 8,897,697, the disclosures of which are incorporated herein by reference in their entirety.

TECHNICAL FIELD

The subject disclosure relates to wireless communications and more particularly to providing connectivity to base stations and distributed antennas using millimeter wavelength surface-wave communications.

BACKGROUND

As smart phones and other portable devices increasingly become ubiquitous, and data usage skyrockets, macrocell base stations and existing wireless infrastructure are being overwhelmed. To provide additional mobile bandwidth, small cell deployment is being pursued, with microcells and picocells providing coverage for much smaller areas than traditional macrocells, but at high expense.

DETAILED DESCRIPTION

Figure 1:
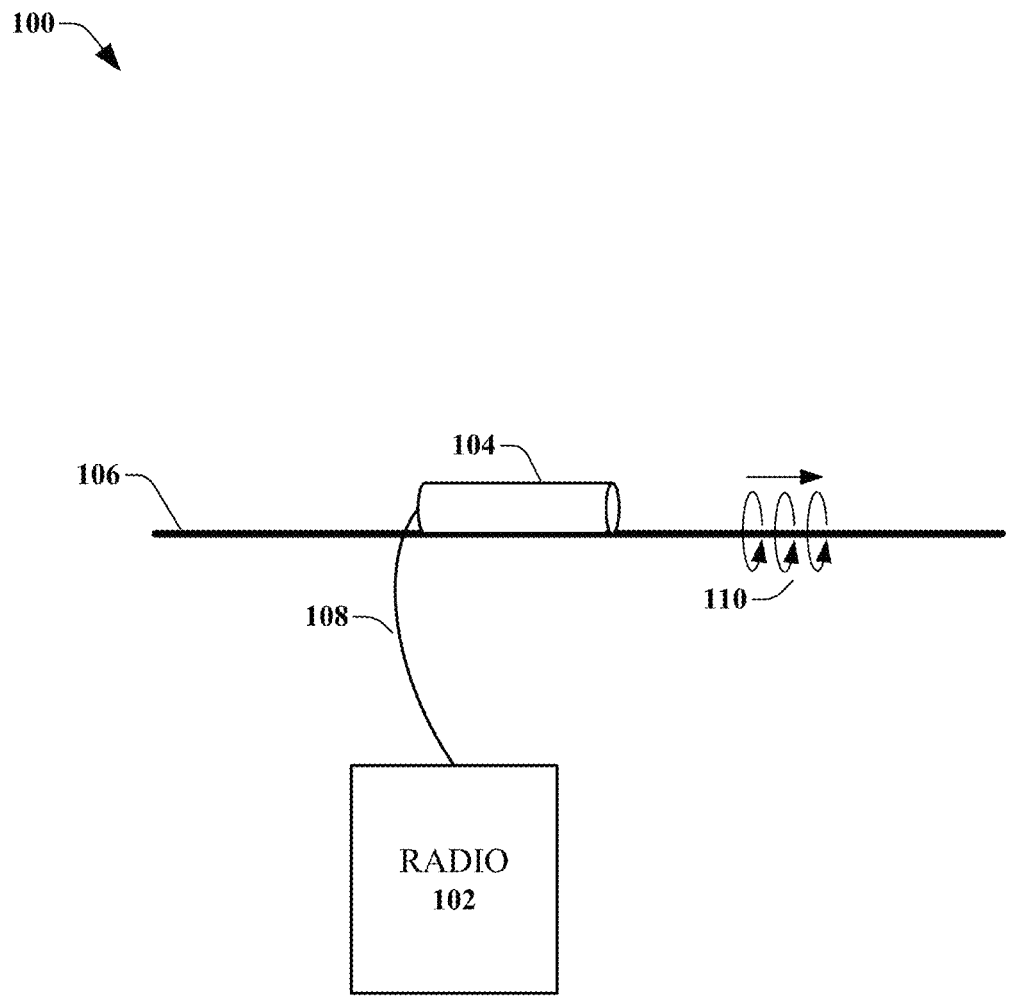
FIG. 1 is a block diagram illustrating an example, non-limiting embodiment of a surface-wave communications system in accordance with various aspects described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

To provide network connectivity to additional base stations, the backhaul network that links the microcells and macrocells to the core network correspondingly expands. Similarly, to provide network connectivity to a distributed antenna system, the communication system that links base stations and their distributed antennas correspondingly expands. Providing wireless backhaul and networking connections are difficult due to the limited bandwidth available at commonly used frequencies. Fiber and cable have bandwidth, but installing the connections can be cost prohibitive due to the distributed nature of small cell deployment.

For these considerations as well as other considerations, in one or more embodiments, a system includes a memory to store executable instructions and a processor, coupled to the memory to facilitate execution of the executable instructions to perform operations including facilitating receipt of a signal and modulating a carrier-wave signal with the signal, wherein the carrier-wave signal is a millimeter-wave signal. The operations also include generating a transmission based on the carrier-wave signal and the signal. The operations further include emitting the transmission as a guided wave on a surface of a wire via a coupling device.

In another embodiment, a method includes receiving, by a device including a processor, a signal and modulating a carrier wave with the signal. The method can also include generating a transmission based on the carrier-wave signal and the signal, wherein the transmission is a millimeter-wave transmission. The method can also include emitting the transmission as a guided surface-wave on a wire.

In another embodiment, an apparatus can include a frequency mixer that is configured to combine a signal and a carrier wave. The apparatus can further include a transmitter configured to generate a transmission based on the signal and the carrier wave, wherein the transmission has a wavelength corresponding to a millimeter-wave band. The apparatus can also include a coupling device configured to emit the transmission as a guided wave on a surface of a wire.

Various embodiments described herein relate to a system that provides a surface-wave communication system for small cell deployment and/or a backhaul connection for a small cell deployment. Rather than building new structures, and installing additional fiber and cable, embodiments described herein disclose using high-bandwidth, millimeter-wave (30 GHz-300 GHz) communications and existing power line infrastructure. Above ground network connections via power lines can provide connectivity to the distributed base stations.

In another embodiment, base station nodes and/or antennas can be installed on utility poles, and the network connection can be provided by transmitters that send millimeter-wave surface-wave transmissions via the power lines between nodes. A single site with one or more base stations can also be connected via the surface-wave transmission over power lines to a distributed antenna system, with cellular antennas located at the nodes.

Turning now to FIG. 1, illustrated is an example, non-limiting embodiment of a surface-wave communication system 100 in accordance with various aspects described herein. Surface-wave communication system 100 includes a radio device 102 that is communicably coupled to a coupling device 104 that emits a guided wave 110 that travels along wire 106.

Radio device 102 can receive a signal and generate a transmission based on the signal and a carrier wave. The carrier wave signal is modulated by the signal, and the resulting transmission can be carried by waveguide 108 to coupling device 104. In an embodiment, radio device 102 receives the signal from a base station device, the signal being directed at a distributed antenna. In another embodiment, radio device 102 can receive the signal via a network connection via a physical or wireless connection to existing network infrastructure. The network connection can be via fiber and/or cable, or by a high-bandwidth microwave connection. The transmission generated by the radio device 102 can then be directed towards base station devices communicably coupled to the wire 106.

Waveguide 108 can facilitate transportation of the transmission from radio device 102 to coupling device 104. In an embodiment, waveguide 108 can be a hollow conductive metal pipe that can transport the millimeter-wave band transmission from the radio device 102 to the coupling device 104. In other embodiments, when coupling device 104 includes a frequency mixer for combining the signal and the carrier wave signal, the waveguide 108 can be a transmission line such as a cable, and can transport the signal to the coupling device 104 from a modem or other device that receives the network connection.

In an embodiment, coupling device 104 is a planar antenna attached to the wire 106 and is configured to emit the guided wave 110 along the surface of the wire 106. In an embodiment, the coupling device 104 can be powered by inductively coupling electric power flowing in the wire 106. The power can also be passed on to radio device 102. In other embodiments, the coupling device 104 and the radio device 102 can be powered by battery or by solar or other electrical power supply.

Guided wave 110 can be a millimeter-wave band wave that propagates along the wire 106. The wire 106 acts as a type of waveguide that functions by slowing the propagation velocity of electromagnetic waves below the free-space velocity, causing the wavefronts to slightly bend inwards towards the wire 106, which keeps the waves entrained. Bends of large radius are tolerated, but too sharp a bend in the wire 106 will cause the line to radiate and lose energy into space. Guided surface-waves can propagate down both insulated and bare metal cables. Accordingly, wire 106 can be insulated in some embodiments, and non-insulated in other embodiments.

In an embodiment, the wavelength of the transmission is comparable in size, or smaller than a circumference of the wire 106. In an example, if the wire 106 has a diameter of 0.5 cm, and a corresponding circumference of around 1.5 cm, the wavelength of the transmission is around 1.5 cm or less, corresponding to a frequency of 20 GHz or greater. In another embodiment, an ideal frequency of the transmission and the carrier-wave signal is around 38 GHz. In experimental results, when the circumference of the wire 106 is comparable in size to, or greater, than a wavelength of the transmission, the guided wave 110 exhibits a plurality of surface-wave modes. The guided wave 110 can therefore comprise more than one type of electrical and magnetic field configuration. As the guided wave 110 propagates down the wire 106, the plurality of electrical and magnetic field configurations will remain the same from end to end of the wire 106.

In the fundamental transverse electromagnetic mode ($TEM_{00}$), where neither electrical nor magnetic fields extend in the direction of propagation, and the fields extend radially outwards, the mode pattern is symmetric with regard to the longitudinal axis of the wire 106. If the mode pattern is symmetric, it does not matter at which orientation around the wire 106 that the coupling device 104 and a receiver (not shown) are placed with respect to each other. According to experimental results however, when the circumference of the wire 106 is comparable in size to, or greater, than a wavelength of the transmission, multi-mode behavior is exhibited and at least one of the modes present is asymmetrical, as periodic nulls are experienced when rotating a receiver around the wire 106 with respect to the coupling device 104.

In an embodiment, multiple asymmetric modes are present, and therefore a receiver that is configured to receive transmissions of a first mode may have a different orientation with respect to the coupling device 104 than a receiver that is configured to receive transmissions of a second mode. In another embodiment, a plurality of signals can be multiplexed and/or otherwise combined into a transmission, where each signal corresponds to a different mode of the transmission. Receivers can therefore receive different signals from the same transmission based on the modes that the receivers are configured to receive.

In an embodiment, the coupling device 104 and/or radio device 102 can determine what is the diameter and/or circumference of the wire 106. The determination can be made based on measurements taken optically or mechanically, or based on data input during installation. Based on the determination of the diameter and/or circumference of the wire 106, the radio device 102 can generate a carrier-wave signal with an optimal frequency for transmission.

In an embodiment, wire diversity paths can be utilized to improve performance based on environmental conditions. Redundant transmissions can be sent over two different wires, one insulated, and one uninsulated. The wire that the transmission is received from can be selected based on the environmental conditions. Attenuation losses in dry weather are lower when wire 106 is insulated. However, insulated wires are more susceptible to losses when rain or other adverse weather conditions are present. Therefore, radio device 102 can output transmissions to two or more coupling devices (similar to coupling device 104) that are coupled to insulated and uninsulated wires. When the wires are dry, receivers (not shown) can receive the signals from the insulated wires. When the wires are not dry however, the transmissions can be received from the uninsulated wire.

Figure 2:
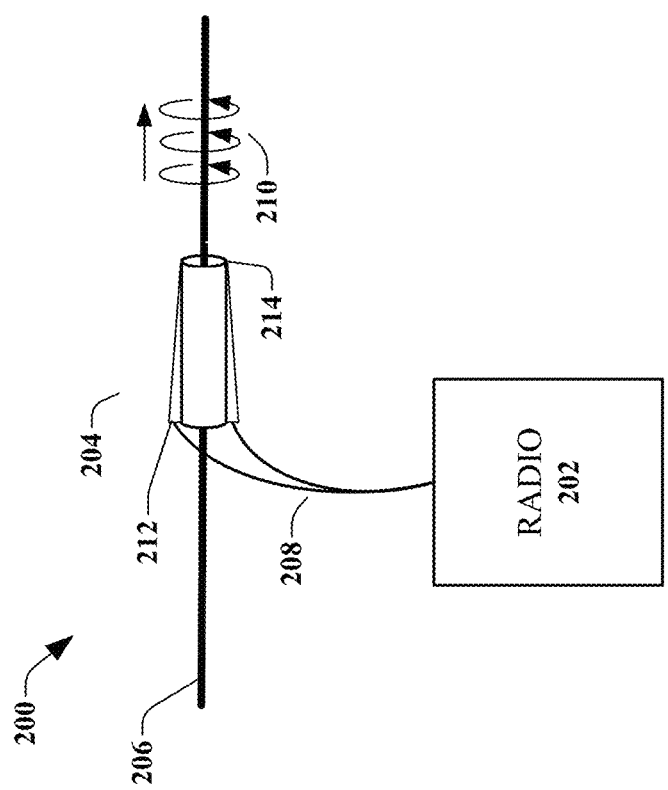
FIG. 2 is a block diagram illustrating an example, non-limiting embodiment of a surface-wave communications system in accordance with various aspects described herein.

Turning now to FIG. 2, illustrated is a block diagram of an example, non-limiting embodiment of a surface-wave communications system 200. Surface-wave communication system 200 includes a radio device 202 that is communicably coupled to a coupling device 204 that emits a guided wave 210 that travels along wire 206. Waveguides 208 can facilitate transportation of the transmission from radio device 202 to coupling device 204.

In an embodiment, coupling device 204 can be a waveguide to coax coupling device. A waveguide port 212 can be configured to wrap around a quarter of the wire 206. A total of four waveguide ports can be included and power can be supplied to each of the waveguide ports. An air buffer or dielectric spacer can be used to insulate a metallic outer shield 214 from the wire 206. The structure of the modes in the guided wave 210 can be controlled by adjusting the relative amplitude and phase of power injected into the waveguide ports.

Figure 3:
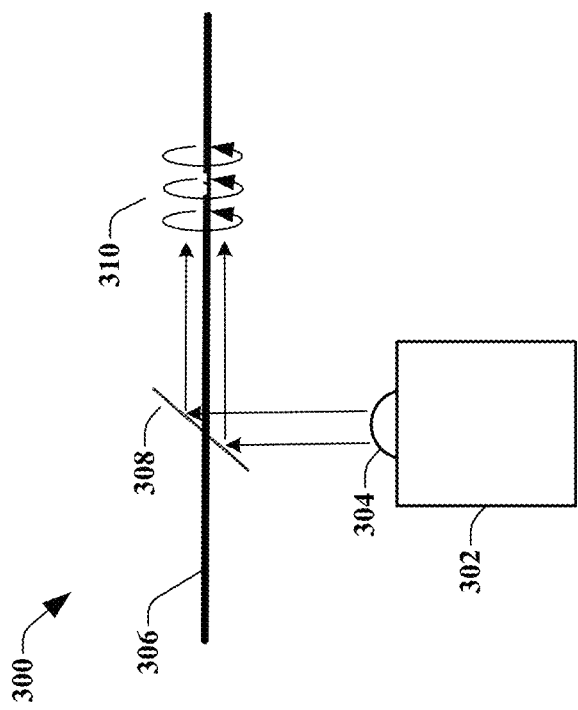
FIG. 3 is a block diagram illustrating an example, non-limiting embodiment of a surface-wave communications system in accordance with various aspects described herein.

FIG. 3 illustrates a block diagram of an example, non-limiting embodiment of a surface-wave communications system 300 in accordance with various aspects described herein. Specially trained and certified technicians are required to work with high voltage and medium voltage power lines. Locating the circuitry away from the high voltage and medium voltage power lines allows ordinary craft technicians to install and maintain the circuitry. Accordingly, in this embodiment, a quasi-optical coupling system allows the base station and radio sources to be detached from the power lines.

At millimeter-wave frequencies, where the wavelength is small compared to the macroscopic size of the equipment, the millimeter-wave transmissions can be transported from one place to another and diverted via lenses and reflectors, much like visible light. Accordingly, a reflector 308 can be placed and oriented on wire 306 such that millimeter-wave transmissions sent from radio source and/or transmitter 302 and focused via dielectric lens 304 are reflected parallel to the wire 306, such that it is guided by the power line as a surface-wave 310. Lens modes that are transmitted by the transmitter 302 couple to the wire 306.

Figure 4:
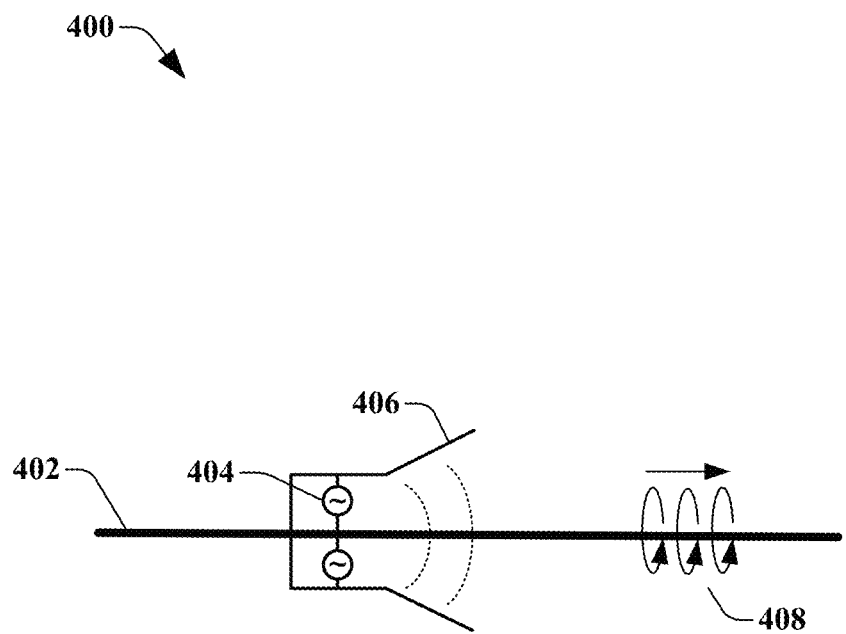
FIG. 4 is a block diagram illustrating an example, non-limiting embodiment of a surface-wave communications system in accordance with various aspects described herein.

Turning now to FIG. 4, a block diagram illustrating an example, non-limiting embodiment of a surface-wave communications system 400 is shown. Coupling device 406 comprises 2 or more monolithic microwave integrated circuits (MMICs) 404 that can operate at millimeter-wave band frequencies. The inline (parallel to the wire 402) design yields a compact structure, and the MMICs 404 are well suited to small dimensions required for millimeter-wave band operation. MMICs radiate a high intensity field that couples to the wire 402 and propagates as guided wave 408 down the wire.

Figure 5:
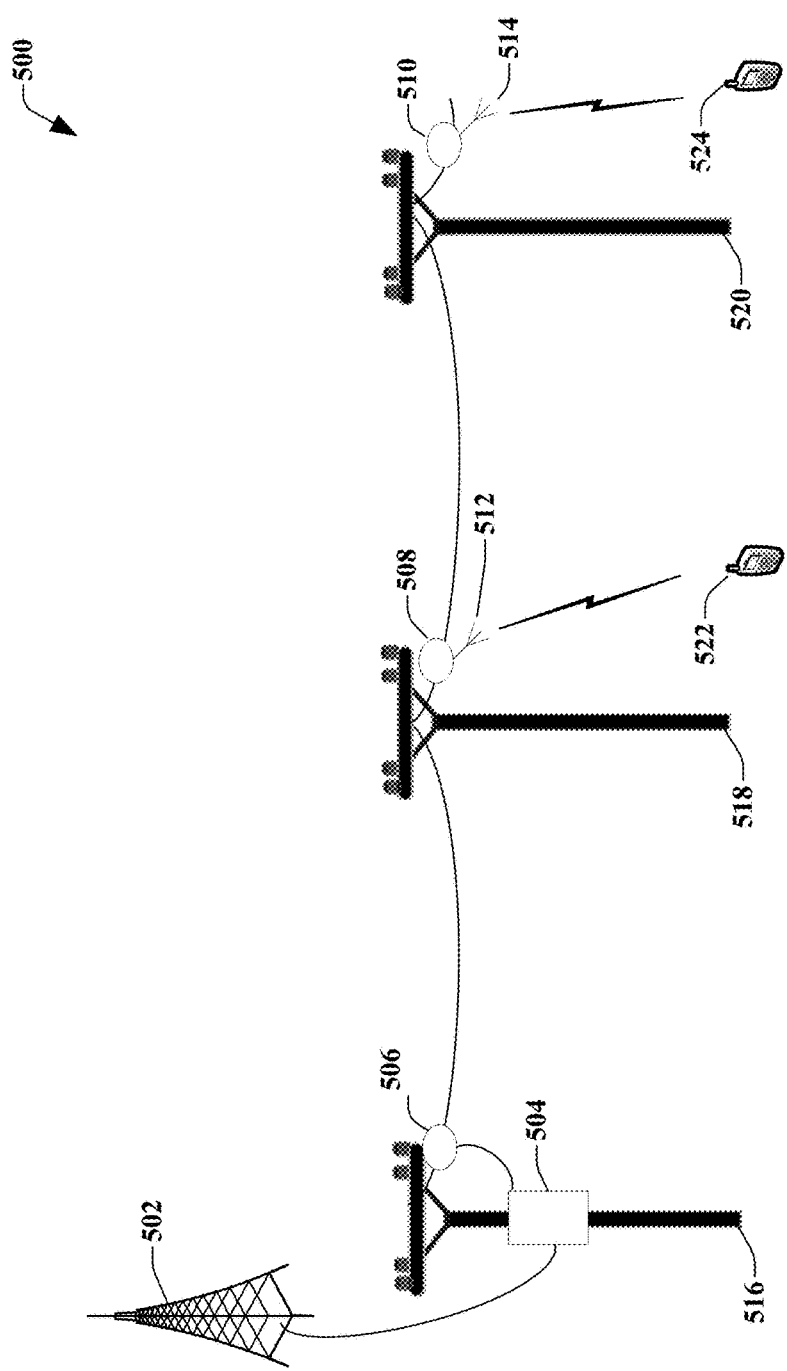
FIG. 5 is a block diagram illustrating an example, non-limiting embodiment of a distributed antenna system in accordance with various aspects described herein.

FIG. 5 illustrates a block diagram of an example, non-limiting embodiment of a distributed antenna system 500. Distributed antenna system 500 includes one or more base stations (e.g., base station device 504) that are communicably coupled to a macrocell site 502 or other network connection. Base station device 504 can be connected by fiber and/or cable, or by a microwave wireless connection to macrocell site 502. Macrocells such as macrocell site 502 can have dedicated connections to the mobile network and base station device 504 can piggyback off of macrocell site 502's connection. Base station device 504 can be mounted on, or attached to, utility pole 516. In other embodiments, base station device 504 can be near transformers and/or other locations situated nearby a power line.

Base station device 504 can provide connectivity for mobile devices 522 and 524. Antennas 512 and 514, mounted on or near utility poles 518 and 520 can receive signals from base station device 504 and transmit those signals to mobile devices 522 and 524 over a much wider area than if the antennas 512 and 514 were located at or near base station device 504.

It is to be appreciated that FIG. 5 displays three utility poles, with one base station device, for purposes of simplicity. In other embodiments, utility pole 516 can have more base station devices, and one or more utility poles with distributed antennas are possible.

A coupling device 506 can transmit the signal from base station device 504 to antennas 512 and 514 over a power line(s) that connect the utility poles 516, 518, and 520. To transmit the signal, radio source and/or coupler 506 upconverts the signal (via frequency mixing) from base station device 504 to a millimeter-wave band signal and the coupling device 506 can launch a millimeter-wave band surface-wave (via embodiments shown in FIGS. 1-4) that propagates as a guided wave traveling along the wire. At utility pole 518, a coupling device 508 receives the surface-wave and can amplify it and send it forward on the power line. The coupling device 508 can also extract a signal from the millimeter-wave band surface-wave and shift it down in frequency to its original cellular band frequency (e.g., 1.9 GHz or other cellular frequency). An antenna 512 can transmit the downshifted signal to mobile device 522. The process can be repeated by coupling device 510, antenna 514 and mobile device 524.

Transmissions from mobile devices 522 and 524 can also be received by antennas 512 and 514 respectively. The repeaters 508 and 510 can upshift the cellular band signals to millimeter-wave band and transmit the signals as surface-wave transmissions over the power line(s) to base station device 504.

In an embodiment, system 500 can employ diversity paths, where two or more wires are strung between the utility poles 516, 518, and 520 and redundant transmissions from base station 504 are transmitted as guided waves down the surface of the wires. The wires can be both insulated and uninsulated, and depending on the environmental conditions that cause transmission losses, the coupling devices can selectively receive signals from the insulated or uninsulated wires. The selection can be based on measurements of the signal-to-noise ratio of the wires, or based on determined weather/environmental conditions (e.g., moisture detectors, weather forecasts, and etc.).

Figure 6:
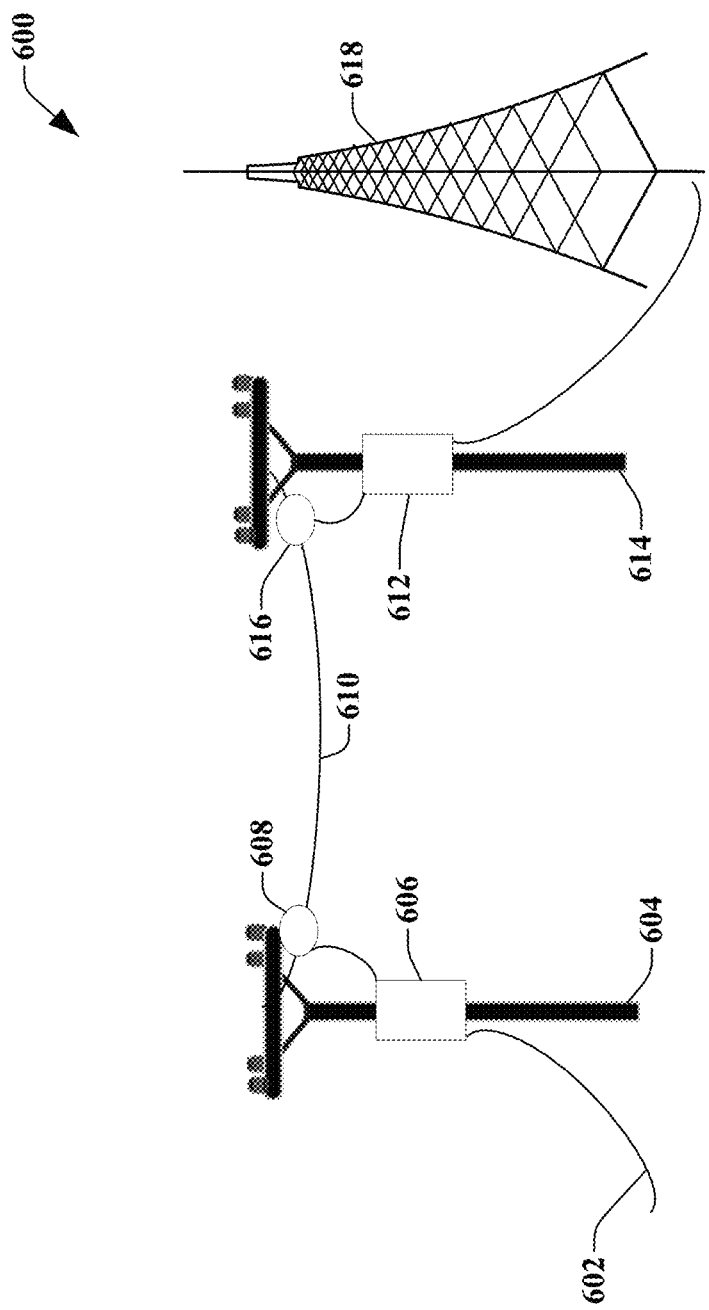
FIG. 6 is a block diagram illustrating an example, non-limiting embodiment of a backhaul system in accordance with various aspects described herein.

Turning now to FIG. 6, illustrated is a block diagram of an example, non-limiting embodiment of a backhaul system 600. Backhaul system 600 can provide network connections to macrocells (e.g., macrocell 618) in lieu of physical cables/fiber, etc. Backhaul system 600 in other embodiments can also provide network connections to residential or business locations and other end users.

Network connection 602 can be received by radio device 606 attached to utility pole 604 that combines the network signal with a carrier-wave signal and generates a transmission that is sent to coupling device 608. Coupling device 608 can launch or otherwise emit the transmission as a guided wave on the surface of wire 610. Coupling device 616 on or near utility pole 614 can receive the transmission and forward it to radio device 612 that downconverts the transmission and forwards it to macrocell 618. It is to be appreciated that while FIG. 6 displays only one leg of a surface-wave transmission between two utility poles, in other embodiments, multiple legs are possible with coupling devices functioning as repeaters at one or more of the utility poles.

Coupling device 616 can be oriented around the wire 610 relative to the coupling device 608 in order to receive a specific mode of the transmission. The mode selected could be the mode that exhibits the best transmission characteristics or the least attenuation. Backhaul system 600 can also take advantage of diversity paths using two or more wires, with one insulated and one uninsulated.

Figure 7:
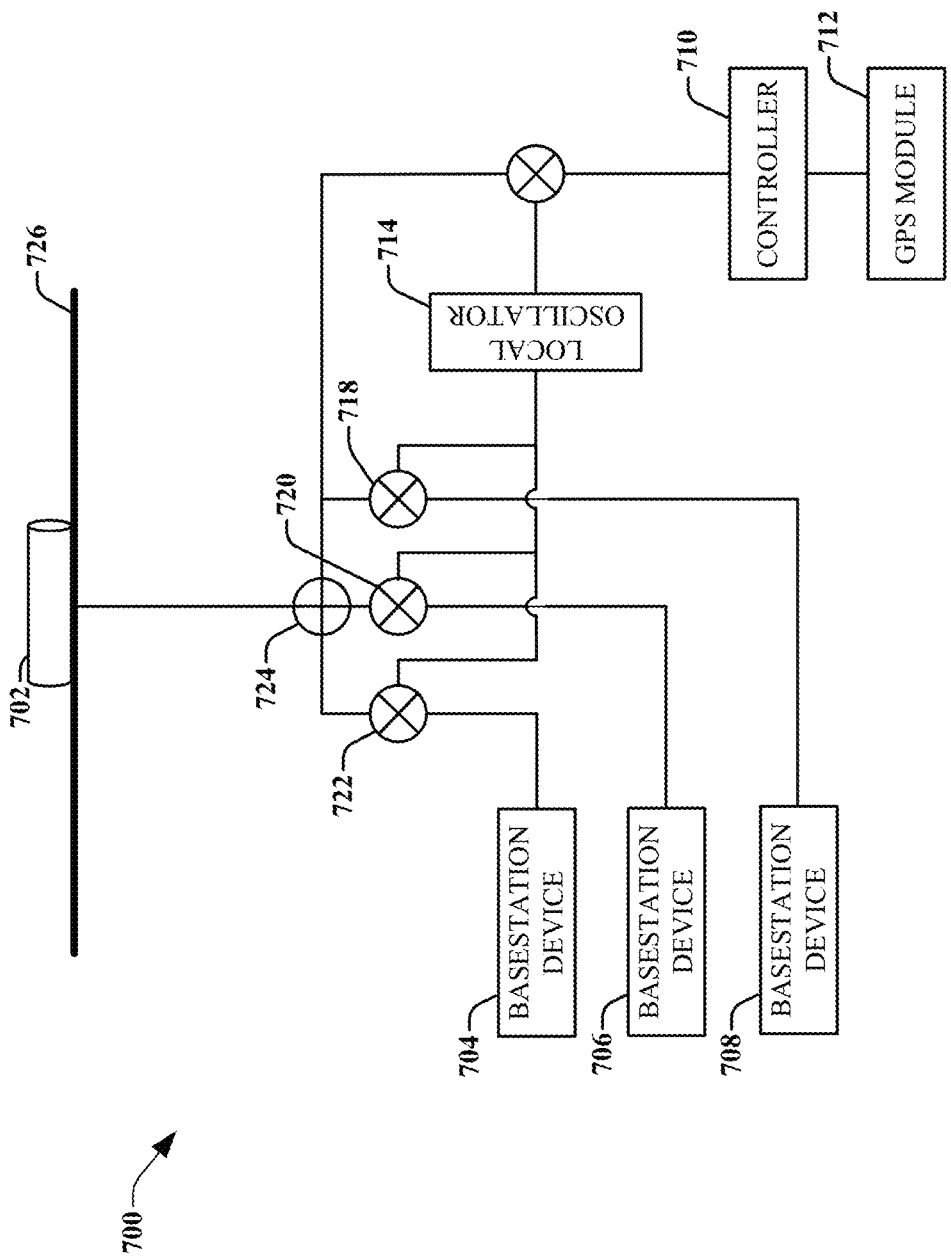
FIG. 7 is a block diagram illustrating an example, non-limiting embodiment of a surface-wave radio and antenna apparatus in accordance with various aspects described herein.

Turning now to FIG. 7, a block diagram illustrating an example, non-limiting embodiment of a surface-wave radio and antenna apparatus 700 for a distributed antenna system is shown. System 700 includes base station devices 704, 706, and 708 that transmit to and receive signals from mobile devices that are in their respective cells. It is to be appreciated that system 700 is shown with 3 microcell base station devices purely for exemplary reasons. In other embodiments, a base station site, or cluster can contain one or more base station devices. It is also to be appreciated that while FIG. 7 corresponds to an apparatus for a distributed antenna system, a similar apparatus can be used in a backhaul system to provide network connectivity to other base station devices.

The outputs of the base station devices 704, 706, and 708 can be combined with a millimeter-wave carrier wave generated by a local oscillator 714 at frequency mixers 722, 720, and 718 respectively. Frequency mixers 722, 720, and 718 can use heterodyning techniques to frequency shift the signals from base station devices 704, 706, and 708. This can be done in the analog domain, and as a result, the frequency shifting can be done without regard to the type of communications protocol that base station devices 704, 706, and 708 use. Over time, as new communications technologies are developed, the base station devices 704, 706, and 708 can be upgraded or replaced and the frequency shifting and transmission apparatus can remain, simplifying upgrades.

The controller 710 can generate the control signal that accompanies the carrier wave, and GPS module 712 can synchronize the frequencies for the control signal such that the exact frequencies can be determined. The GPS module 712 can also provide a time reference for the distributed antenna system.

Multiplexer/demultiplexer 724 can frequency division multiplex the signals from frequency mixers 718, 720, and 722 in accordance with the control signal from controller 710. Each of the signals can be assigned channels at the microcells 704, 706, and 708, and the control signal can provide information indicating the microcell signals that correspond to each channel. Coupling device 702 can then launch the transmission generated along wire 726 as a guided surface-wave.

Coupling device 702 can also receive transmissions sent by other coupling devices, where the transmission's carrier wave are carrying signals directed at the base station devices 704, 706, and 708 from mobile devices. Multiplexer/demultiplexer 724 can separate the subcarrier signals from each other and direct them to the correct base station devices based on the channels of the signals, or based on metadata in the control signal. The frequency mixers 718, 720, and 722 can then extract the signals from the carrier wave and direct the signals to the corresponding microcells.

Figure 8:
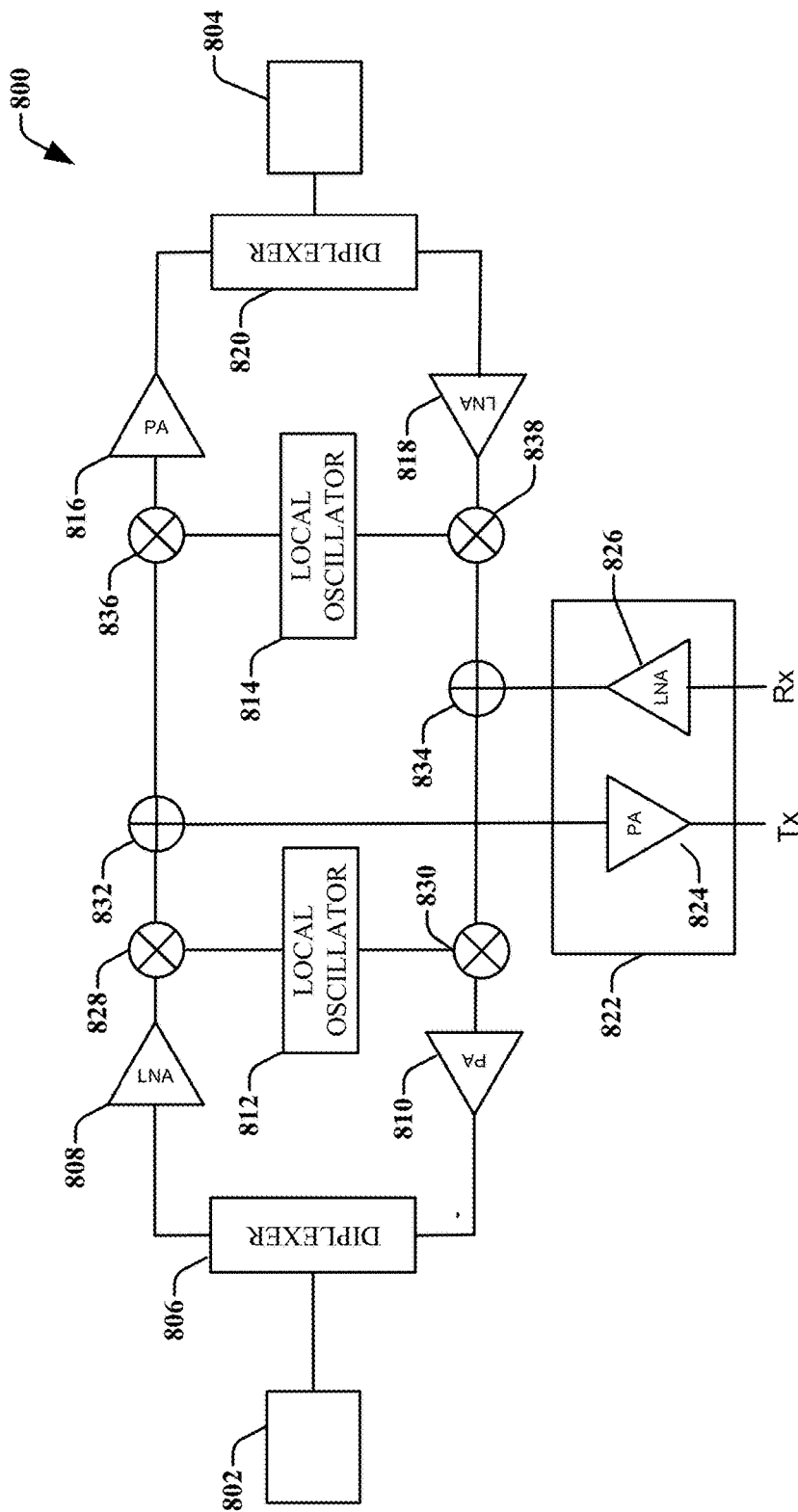
FIG. 8 is a block diagram illustrating an example, non-limiting embodiment of a surface-wave repeater system in accordance with various aspects described herein.

Turning now to FIG. 8, illustrated is a block diagram illustrating an example, non-limiting embodiment of a surface-wave repeater system 800. Surface-wave repeater system 800 includes coupling devices 802 and 804 that receive and transmit transmissions from other coupling devices located in the distributed antenna system or backhaul system.

In various embodiments, coupling device 802 can receive a transmission from another coupling device, wherein the transmission has a plurality of subcarriers. Diplexer 806 can separate the transmission from other transmissions, and direct the transmission to low-noise amplifier ("LNA") 808. A frequency mixer 828, with help from a local oscillator 812, can downshift the transmission (which is in the millimeter-wave band) to the native frequency, whether it is a cellular band (~1.9 GHz) for a distributed antenna system or other frequency for a backhaul system. An extractor 832 can extract the signal on the subcarrier that corresponds to antenna or other output component 822 and direct the signal to the output component 822. For the signals that are not being extracted at this antenna location, extractor 832 can redirect them to another frequency mixer 836, where the signals are used to modulate a carrier wave generated by local oscillator 814. The carrier wave, with its subcarriers, is directed to a power amplifier ("PA") 816 and is retransmitted by coupling device 804 to another repeater system, via diplexer 820.

At the output device 822 (antenna in a distributed antenna system), a PA 824 can boost the signal for transmission to the mobile device. An LNA 826 can be used to amplify weak signals that are received from the mobile device and then send the signal to a multiplexer 834 which merges the signal with signals that have been received from coupling device 804. The signals received from coupling device 804 have been split by diplexer 820, and then passed through LNA 818, and downshifted in frequency by frequency mixer 838. When the signals are combined by multiplexer 834, they are upshifted in frequency by frequency mixer 830, and then boosted by PA 810, and transmitted back to the launcher or on to another repeater by coupling devices 802 and 804 respectively.

Figure 9:
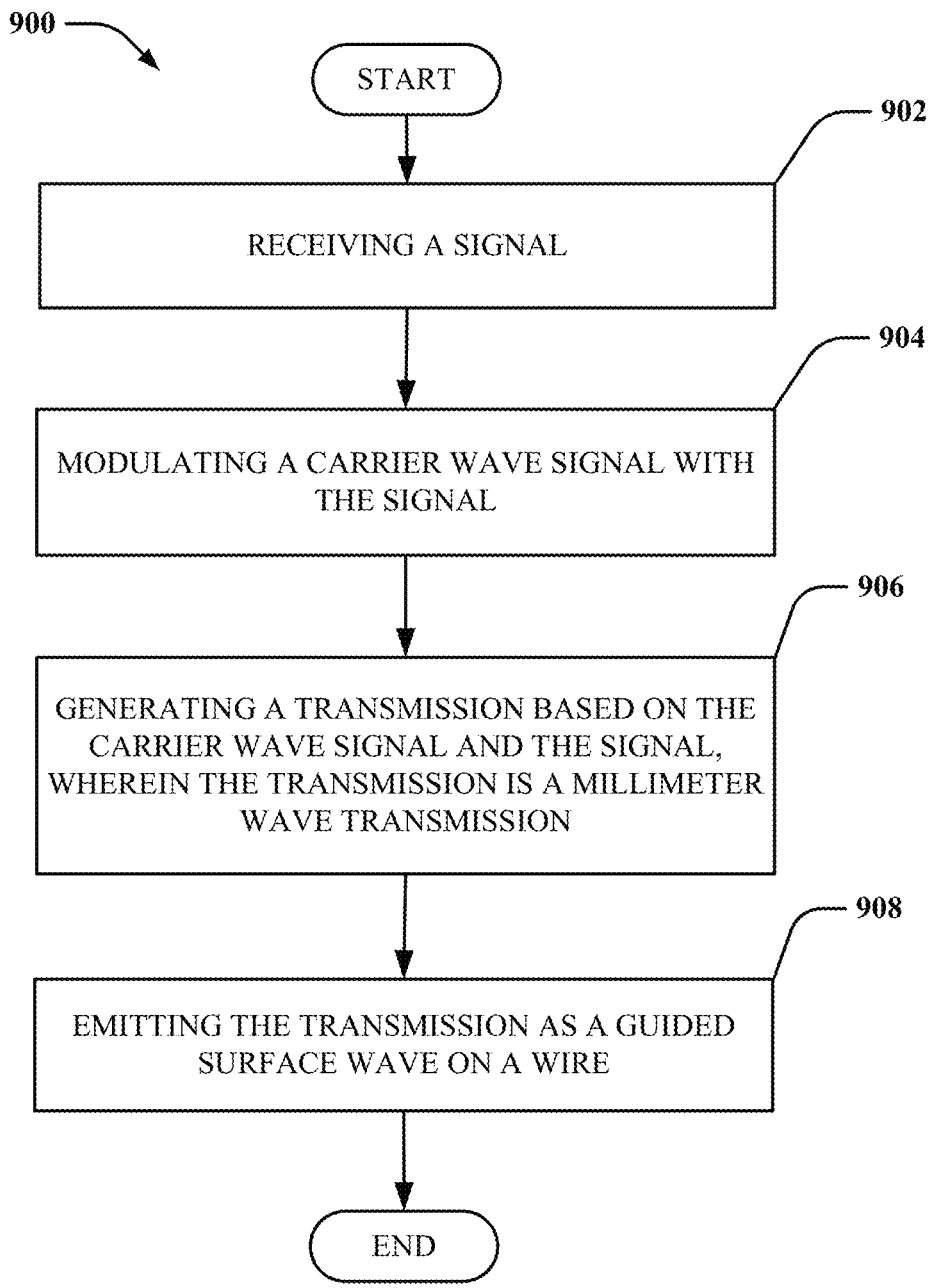
FIG. 9 illustrates a flow diagram of an example, non-limiting embodiment of a method for providing surface-wave communications as described herein.

FIG. 9 illustrates a process in connection with the aforementioned systems. The process in FIG. 9 can be implemented for example by systems 100, 200, 300, 400, 500, 600, 700, and 800 illustrated in FIGS. 1-8 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 9 illustrates a flow diagram of an example, non-limiting embodiment of a method for providing surface-wave communications as described herein. At step 902, a signal is received. The signal can be from a base station device and be directed towards distributed antennas. In other embodiments, the signal can be from a network connection and be directed towards base station devices.

At step 904, a carrier-wave signal is modulated with the signal. The carrier-wave signal can be generated by a local oscillator and modulated using a frequency mixer. The frequency mixers can use heterodyning techniques to frequency shift the signal in the analog domain. Accordingly, the frequency shifting can be done without regard to the type of communication protocol the signal corresponds to.

At 906, a transmission based on the carrier-wave signal and the signal is generated, wherein the transmission is a millimeter-wave transmission. At 908, the transmission can be emitted as a guided surface-wave on a wire. The wire acts as a type of waveguide that functions by slowing the propagation velocity of EM waves below the free-space velocity, causing the wavefronts to slightly bend inwards towards the wire, which keeps the waves entrained. Bends of large radius are tolerated, but too sharp a bend in the wire will cause the line to radiate and lose energy into space.

Guided surface-waves can propagate down both insulated and bare metal cables. Accordingly, the wire can be insulated in some embodiments, and non-insulated in other embodiments.

Figure 10:
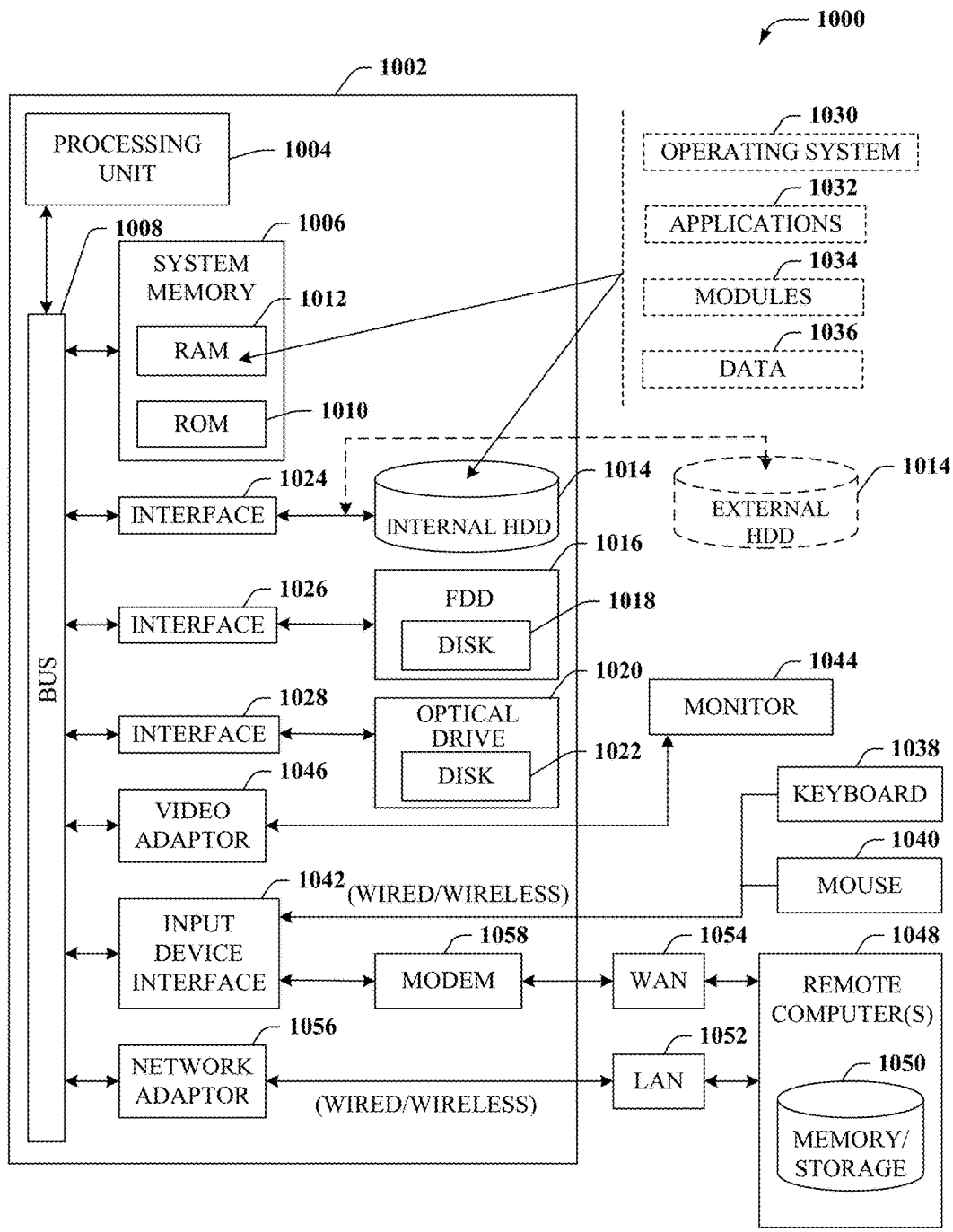
FIG. 10 is a block diagram of an example, non-limiting embodiment of a computing environment in accordance with various aspects described herein.

Referring now to FIG. 10, there is illustrated a block diagram of a computing environment in accordance with various aspects described herein. In order to provide additional context for various embodiments of the embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and Institute of Electrical and Electronics Engineers (IEEE) 994 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless AP disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

Figure 11:
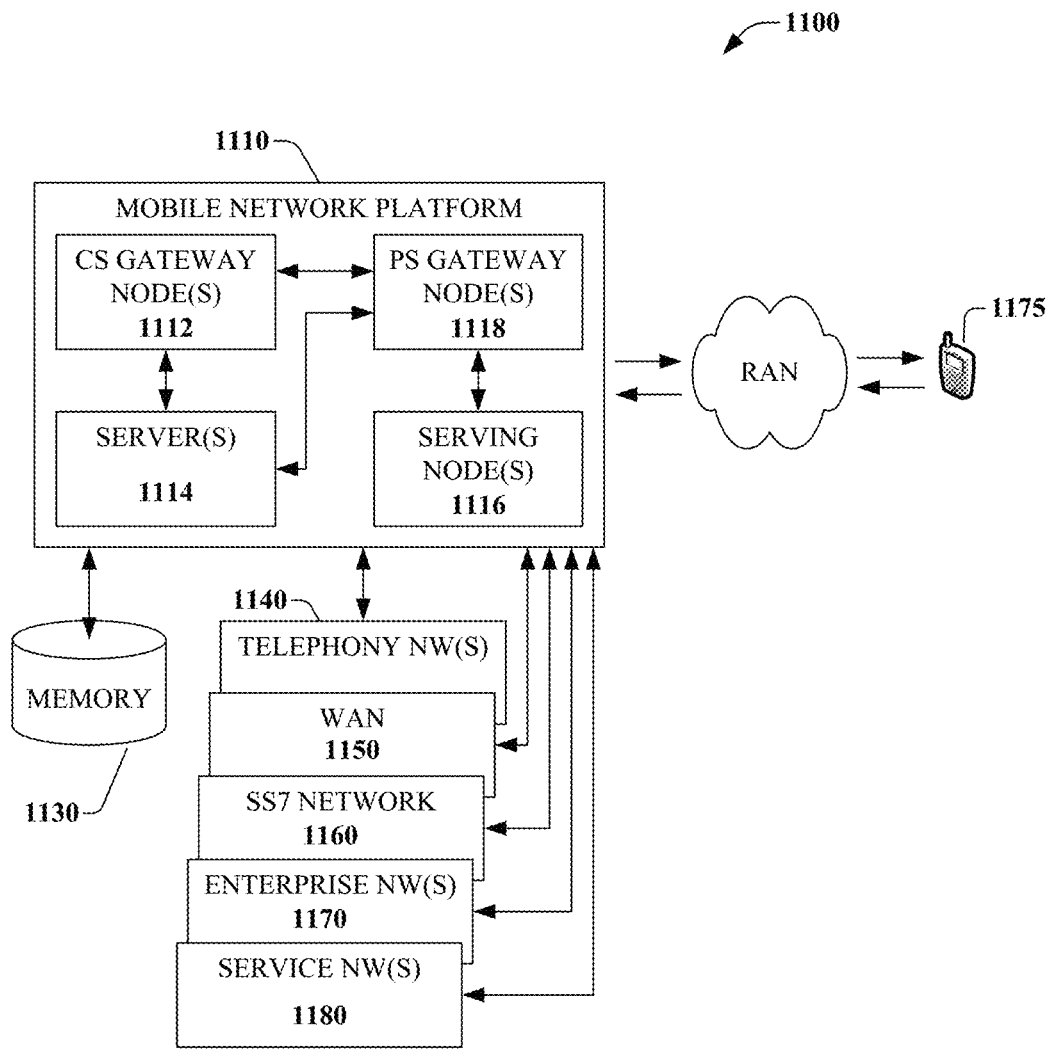
FIG. 11 is a block diagram of an example, non-limiting embodiment of a mobile network platform in accordance with various aspects described herein.

FIG. 11 presents an example embodiment 1100 of a mobile network platform 1110 that can implement and exploit one or more aspects of the disclosed subject matter described herein. Generally, wireless network platform 1110 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1110 can be included in telecommunications carrier networks, and can be considered carrier-side components as discussed elsewhere herein. Mobile network platform 1110 includes CS gateway node(s) 1112 which can interface CS traffic received from legacy networks like telephony network(s) 1140 (e.g., public switched telephone network (PSTN), or public land mobile network (PLMN)) or a signaling system #7 (SS7) network 1170. Circuit switched gateway node(s) 1112 can authorize and authenticate traffic (e.g., voice) arising from such networks. Additionally, CS gateway node(s) 1112 can access mobility, or roaming, data generated through SS7 network 1170; for instance, mobility data stored in a visited location register (VLR), which can reside in memory 1130. Moreover, CS gateway node(s) 1112 interfaces CS-based traffic and signaling and PS gateway node(s) 1118. As an example, in a 3GPP UMTS network, CS gateway node(s) 1112 can be realized at least in part in gateway GPRS support node(s) (GGSN). It should be appreciated that functionality and specific operation of CS gateway node(s) 1112, PS gateway node(s) 1118, and serving node(s) 1116, is provided and dictated by radio technology(ies) utilized by mobile network platform 1110 for telecommunication.

In addition to receiving and processing CS-switched traffic and signaling, PS gateway node(s) 1118 can authorize and authenticate PS-based data sessions with served mobile devices. Data sessions can include traffic, or content(s), exchanged with networks external to the wireless network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1160 can embody, at least in part, a service network(s) like IP multimedia subsystem (IMS). Based on radio technology layer(s) available in technology resource(s) 1117, packet-switched gateway node(s) 1118 can generate packet data protocol contexts when a data session is established; other data structures that facilitate routing of packetized data also can be generated. To that end, in an aspect, PS gateway node(s) 1118 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, wireless network platform 1110 also includes serving node(s) 1116 that, based upon available radio technology layer(s) within technology resource(s) 1117, convey the various packetized flows of data streams received through PS gateway node(s) 1118. It is to be noted that for technology resource(s) 1117 that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in wireless network platform 1110 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1110. Data streams (e.g., content(s) that are part of a voice call or data session) can be conveyed to PS gateway node(s) 1118 for authorization/authentication and initiation of a data session, and to serving node(s) 1116 for communication thereafter. In addition to application server, server(s) 1114 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1110 to ensure network's operation and data integrity in addition to authorization and authentication procedures that CS gateway node(s) 1112 and PS gateway node(s) 1118 can enact. Moreover, provisioning server(s) can provision services from external network(s) like networks operated by a disparate service provider; for instance, WAN 1150 or Global Positioning System (GPS) network(s) (not shown). Provisioning server(s) can also provision coverage through networks associated to wireless network platform 1110 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1175.

It is to be noted that server(s) 1114 can include one or more processors configured to confer at least in part the functionality of macro network platform 1110. To that end, the one or more processor can execute code instructions stored in memory 1130, for example. It is should be appreciated that server(s) 1114 can include a content manager 1115, which operates in substantially the same manner as described hereinbefore.

In example embodiment 1100, memory 1130 can store information related to operation of wireless network platform 1110. Other operational information can include provisioning information of mobile devices served through wireless platform network 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, enterprise network(s) 1160, or SS7 network 1170. In an aspect, memory 1130 can be, for example, accessed as part of a data store component or as a remotely connected memory store.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)=confidence$ (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
receiving, via a coupling device, an electromagnetic wave guided by a transmission medium, wherein the coupling device has a first longitudinal axis that is not coaxially aligned with a second longitudinal axis of the transmission medium, and wherein a portion of the coupling device is in proximity to a surface of the transmission medium;
generating, based on the electromagnetic wave, an electrical signal;
frequency-shifting the electrical signal, wherein the frequency-shifting results in a frequency-shifted signal; and
transmitting a wireless signal to a communication device, wherein the wireless signal is based on the frequency-shifted signal.

2. The method of claim 1, wherein the wireless signal is transmitted in a cellular frequency band.

3. The method of claim 1, wherein the coupling device comprises a waveguide.

4. The method of claim 1, wherein the communication device comprises a mobile communication device.

5. An apparatus, comprising:
a coupling device that facilitates receiving a guided electromagnetic wave from a transmission medium, the coupling device having an axis that is not coaxially aligned with a longitudinal axis of the transmission medium, the coupling device having a portion thereof in proximity to a surface of the transmission medium;
a local oscillator;
a mixer coupled to the local oscillator, wherein the mixer facilitates generating a frequency-shifted signal based on the guided electromagnetic wave; and
an antenna, wherein the antenna facilitates transmitting a wireless signal that is based on the frequency-shifted signal.

6. The apparatus of claim 5, further comprising an amplifier, wherein the amplifier facilitates amplifying an electrical signal provided to the mixer, wherein the electrical signal is generated from the guided electromagnetic wave.

7. The apparatus of claim 5, further comprising an amplifier, wherein the amplifier facilitates receiving the frequency-shifted signal from the mixer and providing an amplified signal to the antenna.

8. The apparatus of claim 5, wherein the coupling device comprises a waveguide.

9. The apparatus of claim 5, wherein the guided electromagnetic wave comprises a fundamental wave mode.

10. The apparatus of claim 5, wherein the guided electromagnetic wave comprises a non-fundamental wave mode.

11. The apparatus of claim 5, wherein the wireless signal is transmitted to a mobile communication device.

12. A system, comprising:
means for receiving, via a coupling device, an electromagnetic wave guided by a transmission medium, wherein the coupling device is not coaxially aligned with a longitudinal axis of the transmission medium, and wherein a portion of the coupling device is proximal to a surface of the transmission medium;
means for generating an electrical signal based on the electromagnetic wave;
means for frequency-shifting the electrical signal to generate a frequency-shifted signal; and
means for transmitting a wireless signal based on the frequency-shifted signal.

13. The system of claim 12, wherein the wireless signal is transmitted, by the means for transmitting, in a cellular frequency band.

14. The system of claim 12, wherein the wireless signal is transmitted, by the means for transmitting, to a communication device.

15. The system of claim 12, wherein the electromagnetic wave comprises an asymmetric wave.

16. The system of claim 12, wherein the electromagnetic wave comprises a symmetric wave.

17. The system of claim 12, wherein a wavelength of the electromagnetic wave is less than a circumference of the transmission medium.

18. The system of claim 12, wherein the transmission medium comprises an uninsulated conductor.

19. The system of claim 12, wherein the transmission medium comprises an insulated conductor.

20. The system of claim 12, wherein the electromagnetic wave at least partially surrounds the transmission medium.

* * * * *